(12) United States Patent
Tabata et al.

(10) Patent No.: US 7,985,598 B2
(45) Date of Patent: Jul. 26, 2011

(54) BIOMOLECULE-IMMOBILIZED PLATE AND METHOD FOR FABRICATING BIOMOLECULE-IMMOBILIZED PLATE

(75) Inventors: Jimpei Tabata, Ehime (JP); Shigeki Joko, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/556,865

(22) Filed: Sep. 10, 2009

(65) Prior Publication Data

US 2010/0009870 A1 Jan. 14, 2010

Related U.S. Application Data

(62) Division of application No. 11/087,755, filed on Mar. 24, 2005, now abandoned.

(51) Int. Cl.
- G01N 33/551 (2006.01)
- C40B 50/00 (2006.01)
- B01L 9/00 (2006.01)

(52) U.S. Cl. .................. 436/524; 506/23; 422/561
(58) Field of Classification Search .............. 436/524; 506/23; 422/561

See application file for complete search history.

(56) References Cited

U.S. PATENT DOCUMENTS

| | | | |
|---|---|---|---|
| 4,054,426 A | 10/1977 | White | |
| 6,306,599 B1 | 10/2001 | Perbost | |
| 6,951,604 B2 * | 10/2005 | Katayama et al. | 205/169 |
| 7,112,617 B2 * | 9/2006 | Kim et al. | 522/83 |
| 2002/0197417 A1 | 12/2002 | Nakamura et al. | |
| 2004/0014080 A1 | 1/2004 | Tanga et al. | |
| 2005/0101006 A1 | 5/2005 | Cheng et al. | |

FOREIGN PATENT DOCUMENTS

| | | |
|---|---|---|
| EP | 1643249 A1 * | 5/2006 |
| JP | 60-15560 | 1/1985 |
| JP | 2001-108683 | 4/2001 |
| WO | 95/35505 | 12/1995 |
| WO | 97/39151 | 10/1997 |
| WO | 99/16907 | 4/1999 |
| WO | WO2005/003769 * | 1/2005 |

OTHER PUBLICATIONS

Teare et al., Cellular Attachment to Ultraviolet Ozone Modified Polystyrene Surfaces, 2000, American Chemical Society, v. 16, p. 2818-2824.*

(Continued)

*Primary Examiner* — Lore Jarrett
(74) *Attorney, Agent, or Firm* — Wenderoth, Lind & Ponack, L.L.P.

(57) ABSTRACT

There is provided a biomolecule-immobilized plate having a flat part, at least a surface of the flat part comprising a polymer material, wherein the flat part has an arithmetic average roughness of 0.1 nm~5 nm, and a portion of the flat part has functional groups. Further, the biomolecule-immobilized plate is fabricated by irradiating the flat part of the plate surface which comprises the polymer material, with an ultraviolet ray under ozone atmosphere to produce functional groups having bonding ability to the biomolecules on a portion of the flat part. Thereby, it is possible to provide a biomolecule-immobilized plate having a surface of a high degree of smoothness on which functional groups are produced, a biomolecule-immobilized plate on which biomolecules are immobilized via functional groups, and methods for fabricating these biomolecule-immobilized plates easily and inexpensively.

6 Claims, 8 Drawing Sheets

OTHER PUBLICATIONS

Fodor, S. et al., "Light-Directed, Spatially Addressable Parallel Chemical Synthesis", *Science*, vol. 251, pp. 767 to 773 (1991).
Lipshutz, R. et al., "High density synthetic oligonucleotide arrays", *Nature Genetics Supplement*, vol. 21, pp. 20 to 24 (1999).

Schena, M. et al., "Quantitative Monitoring of Gene Expression Patterns with a Complementary DNA Microarray", *Science*, vol. 270, pp. 467 to 470 (1995).

* cited by examiner

SEQUENCE LISTING

<160> NUMBER OF SEQ ID NOS: 2

<210> SEQ ID NO 1
<211> LENGTH: 40
<212> TYPE: DNA
<213> ORGANISM: Homo sapiens
<220> FEATURE:
<223> OTHER INFORMATION: Amino-hexyl groups are modified via phosphate groups at 5' end.

<400> SEQUENCE: 1
ccccctggat ccagatatgc aataattttc ccactatcat                              40

<210> SEQ ID NO 2
<211> LENGTH: 40
<212> TYPE: DNA
<213> ORGANISM: Artificial Sequence
<220> FEATURE:
<223> OTHER INFORMATION: It has a sequence complementary to oligonucleotide having a sequence of ccccctggat ccagatatgc aataattttc ccactatcat, and is modified with hexyl-biotin groups via phosphate groups at 5' end.

<400> SEQUENCE: 2
atgatagtgg gaaaattatt gcatatctgg atccaggggg                              40

BIOMOLECULE-IMMOBILIZED PLATE AND METHOD FOR FABRICATING BIOMOLECULE-IMMOBILIZED PLATE

This application is a divisional of Ser. No. 11/087,755, filed Mar. 24, 2005 now abandoned.

TECHNICAL FIELD

The present invention relates to biomolecule-immobilized plates which are obtained by immobilizing biomolecules such as nucleic acid, protein, and peptide onto plates, and fabrication methods thereof.

BACKGROUND ART

Conventionally, in order to detect a biomolecule such as nucleic acid, protein, peptide, enzyme, receptor, antibody, sugar, fat, vitamin, hormone, or a substance related thereto, the biomolecule is immobilized onto an appropriate plate, and antigen, fluorescent material, luminescent material, or the like having high affinity with the immobilized biomolecule is dropped onto the biomolecule, and thereafter, the biomolecule immobilized onto the plate is detected by an optical detection method such as absorptiometry, fluorometry, or emission spectrometry utilizing antigen-antibody reaction, fluorogenic reaction, chemiluminascence reaction, or electrochemical reaction. Since the method of detecting biomolecules immobilized on a plate significantly facilitates addition and removal of reagents during detection of biomolecules, various kinds of immobilization plates have been proposed and put to practical use.

For example, there have been proposed, as immobilization plates, a nitrocellulose film and a nylon film which make hydrophobic bonding to nucleic acid, protein, or the like. To this day, detection of nucleic acid by the southern blotting method or northern blotting method and detection of protein by the western blotting method have been carried out using such nitrocellulose film or nylon film as an immobilization plate.

Further, a plastic plate (micro plate) has also been used as an immobilization plate. For example, a micro plate of about 80×120 mm having 96 pieces of dents, each dent having a diameter of about 7 mm and a depth of about 10 mm, is used, and the surface of the plate with the dents is made to have hydrophobicity, or functional groups are introduced onto the surface, whereby nucleic acid or protein is immobilized by hydrophobic bonding or ion bonding. Since this micro plate enables simultaneous processing of plural specimens, it is utilized for biomolecule detection using the enzyme immunoassay (EIA) or the fluorescent immunoassay (FIA).

Further, the method of bonding biomolecules onto a plate by hydrophobic boding or ion bonding is also applied to microarray technique which has recently been contrived. The microarray technique is a technique of immobilizing 1000 or more biomolecules on a plate such as a slide glass having a size of about 25 mm×75 mm. For example, a DNA probe is immobilized on a slide glass, and the immobilized DNA probe and a labeled target DNA are subjected to hybridization, whereby the target DNA can be speedily detected with high sensitivity (refer to, for example, Japanese Patent No. 3272365; Fodor, S. P. A. et al., Science, 1991, Vol. 251, P. 767; Schena, M et al., Science, 1995, Vol. 270, P. 467). In the micro array technique, glass is mainly used as a material of a plate and, at the beginning, immobilization utilizing ion bonding with biomolecules was employed. However, in the immobilization method utilizing hydrophobic bonding and ion bonding, the immobilized biomolecules might be dissociated from the plate during the process steps of addition of a reaction reagent, washing, and emission, resulting in degradation of bonding stability. Therefore, there is proposed a method in which functional groups are produced on the surface of the glass plate, and the glass plate and the biomolecules are covalently bonded through the functional groups.

For example, there is proposed a method in which, after the surface of a glass plate is oxidized and hydrophilic groups are introduced, an aminosilane coupling agent is condensation-reacted with the hydrophilic groups, thereby to introduce amino groups as functional groups onto the surface of the glass plate (for example, refer to Japanese Patent No. 1649351).

Further, there is proposed a method of introducing carboxyl groups as functional groups onto the surface of a glass plate, using a silane compound that is highly reactive to hydroxyl groups on the surface of the glass plate (for example, Japanese Published Patent Application No. 2001-108683). Since the silane compound is a material having a high degree of reactivity to glass, it is frequently used for introduction of functional groups onto the surface of the glass plate, and further, it is known that the variation in smoothness of the glass plate can be maintained within about 3 nm even after the silane compound processing (for example, refer to Telechem International Inc. website at http://www.arrayit-.com/Products/Substrates/SMA/sma.tml, which is searched on December, 2003).

Further, there are also proposed a method of introducing functional groups by coating the surface of a plate with a polymer (for example, refer to Japanese published Patent Application No. 2001-518604), and a method of introducing carbide as functional groups by vapor-depositing diamond like carbon on the surface of a glass plate (for example, refer to Japanese Published Patent Applications No. 2002-82116 and No. 2002-350440).

Moreover, there is proposed a method of immobilizing gene as biomolecule on the surface of a plate using a microarray technique for gene detection. For example, there is proposed a method in which, after nucleotide is immobilized on the surface of a silicon substrate, the nucleotide having light-polymerized functional groups is successively extended by an application of a semiconductor processing technique, thereby to produce oligonucleotide (for example, refer to Japanese Published Patent Application No. 2000-508542, or Lipshutz, R. J. et al., Nature Genetics supplement, 1999, Vol. 21, P. 20). Further, there is proposed a method in which nucleotide is dropped on a glass plate and then the nucleotide is successively extended by an application of an ink-jet printer technique (for example, refer to Japanese Published Patent Application No. 2001-50960).

In immobilization of biomolecules on a plate, uniformity of the amount of immobilized biomolecules per unit area of the plate is required. In addition, since the immobilized biomolecules are detected utilizing the optical method such as the absorptiometry, fluorometry, or emission spectrometry, it is required that the optical characteristics of the plate itself, such as optical transparency, light scattering, light absorption, and light refraction, should be uniform. Further, it is also required that the smoothness of the surface of the plate itself should be uniform. However, the conventional technique has the following drawbacks with respect to these requirements.

Initially, when a microplate (plastic plate) is used as an immobilization plate, the optical characteristics and smoothness of the surface having dents, onto which biomolecules are immobilized must be uniform. In this case, however, the surface having dents must be subjected to an appropriate physical or chemical processing to make the surface have immobilization ability, and therefore, it is difficult to uniformly maintain the optical characteristics and smoothness of the plate surface until finishing the immobilization process.

On the other hand, although there have been proposed the method of processing a plate with silane compound, the method of coating the surface of a plate with polymer, and the method of vapor-depositing diamond like carbon onto the surface of glass as methods for producing functional groups on the plates to firmly immobilize biomolecules on the plates such as glass, these methods also have drawbacks as follows. Since the silane compound has a high deactivity, introduction of the functional groups is not stably carried out, and thereby the amount of immobilized biomolecules is not uniform. Further, when polymer is coated over the plate surface, unevenness occurs due to the coating layer, and thereby the optical characteristics, the smoothness, and the number of functional groups per unit area (the amount of immobilized biomolecules) of the plate surface are not uniform. Further, when diamond like carbon is vapor-deposited on the surface of the glass plate, the deposited carbon forms a polycrystalline structure, and thereby the plate surface is difficult to be smooth.

Further, in the method of immobilizing biomolecules by introducing functional groups onto glass plates or the like as described above, some functional groups that do not react with desired biomolecules may be adsorbed to or combined with undesired biomolecules, and this may cause noise components during measurement.

Furthermore, the method of immobilizing gene on a silicon substrate by utilizing the semiconductor processing technique enables highly accurate immobilization of gene. However, since this method utilizes expanding formation of nucleotide on the substrate, it is only applicable to gene which comprises a combination of four kinds of bases, and it is difficult to apply this method to immobilization of other biomolecules. Further, the above-mentioned method of immobilizing gene using the ink-jet technique also has similar problems.

Furthermore, in the microarray technique of immobilizing 1000 or more specimens on a glass-slide-sized glass plate, since there are great number of specimens per unit area which are to be immobilized on the biomolecule-immobilized plate, the diameter of a spot corresponding to one specimen becomes several tens of microns, and thereby the amount of immobilized biomolecules per specimen becomes very small. Therefore, when using the microarray technique, in order to improve the detection accuracy, not only uniformity of the optical characteristics of the plate itself but also formation of a highly smooth plate having no positional irregularity, no strains, and no minute flaws are required. Accordingly, a very expensive plate as compared with a slide glass plate used for microscopic observation or the like must be used. For example, when silicon is used as a plate, high smoothness can be obtained as is evident from the semiconductor fabrication method. However, a silicon plate is expensive. So, an inexpensively producible plate alternative to glass or silicon has been desired. Moreover, in the microarray technique, when biomolecules are immobilized on a plate such as a glass, a liquid droplet containing the biomolecules is applied by a pin spotter or the like. So, if functional groups are previously introduced over the surface of the plate, the functional groups may cause positional deviation and uneven shape of the spot, resulting in a reduction in detection accuracy.

The present invention is made to solve the above-mentioned problems and has for its object to provide a biomolecule-immobilized plate having a highly smooth surface on which functional groups are produced, a biomolecule-immobilized plate on which biomolecules are immobilized via the functional groups, and methods for fabricating biomolecule-immobilized plates by which these plates can be fabricated easily and inexpensively.

SUMMARY OF THE INVENTION

A biomolecule-immobilized plate according to the present invention is a plate having a flat part, at least a surface of the flat part comprising a polymer material, wherein the flat part has an arithmetic average roughness of 0.1 nm~5 nm, and a portion of the flat part has functional groups.

According to the biomolecule-immobilized plate of the present invention, even when biomolecules are immobilized via functional groups, since the degree of smoothness is high, optical detection for the immobilized biomolecules is not disturbed.

Further, a biomolecule-immobilized plate according to the present invention is a plate having a flat part, at least a surface of the flat part comprising a polymer material, wherein the flat part has an arithmetic average roughness of 0.1 nm~5 nm, and a portion of the flat part has carboxyl groups.

According to the biomolecule-immobilized plate of the present invention, even when biomolecules are immobilized via carboxyl groups, since the degree of smoothness is high, optical detection for the immobilized biomolecules is not disturbed.

Further, a biomolecule-immobilized plate according to the present invention is a plate having a flat part, at least a surface of the flat part comprising a polymer material, wherein the flat part has an arithmetic average roughness of 0.1 nm~5 nm, and a portion of the flat part has biomolecules which are bonded thereto via functional groups and protective groups which protect those functional groups that have no biomolecules bonded thereto.

According to the biomolecule-immobilized plate of the present invention, even when biomolecules are immobilized via functional groups, since the degree of smoothness is high, optical detection for the immobilized biomolecules is not disturbed. Further, since the functional groups which are not reacted with the biomolecules are protected by protective groups, the functional groups in their free states never bind to excess biomolecules, whereby the biomolecules can be stably immobilized with the functional groups.

Further, a biomolecule-immobilized plate according to the present invention is a plate having a flat part, at least a surface of the flat part comprising a polymer material, wherein the flat part has an arithmetic average roughness of 0.1 nm~5 nm, and a portion of an arbitrary-shaped area in the flat part has biomolecules which are bonded thereto via functional groups and protective groups which protect those functional groups that have no biomolecules bonded thereto.

According to the biomolecule-immobilized plate of the present invention, even when biomolecules are immobilized via functional groups, since the degree of smoothness is high, optical detection for the immobilized biomolecules is not disturbed. Further, since biomolecules are immobilized onto only an arbitrary area on the plate surface, immobilization position and shape of biomolecules can be accurately limited. Furthermore, since the functional groups which are not reacted with the biomolecules are protected by protective groups, the functional groups in their free states never bind to excess biomolecules, whereby the biomolecules can be stably immobilized with the functional groups.

Further, a biomolecule-immobilized plate according to the present invention is a plate having a flat part, at least a surface of the flat part comprising a polymer material, wherein the flat part has an arithmetic average roughness of 0.1 nm~5 nm, and a portion of the flat part has biomolecules which are bonded thereto via carboxyl groups and protective groups which protect those carboxyl groups that have no biomolecules bonded thereto.

According to the biomolecule-immobilized plate of the present invention, even when biomolecules are immobilized via carboxyl groups, since the degree of smoothness is high, optical detection for the immobilized biomolecules is not disturbed. Further, since the carboxyl groups which are not reacted with the biomolecules are protected by protective groups, the carboxyl groups in their free states never bind to excess biomolecules, whereby the biomolecules can be stably immobilized with the carboxyl groups.

Further, a biomolecule-immobilized plate according to the present invention is a plate having a flat part, at least a surface of the flat part comprising a polymer material, wherein the flat part has an arithmetic average roughness of 0.1 nm~5 nm, and a portion of an arbitrary-shaped area in the flat part has biomolecules which are bonded thereto via carboxyl groups and protective groups which protect those carboxyl groups that have no biomolecules bonded thereto.

According to the biomolecule-immobilized plate of the present invention, even when biomolecules are immobilized via functional groups, since the degree of smoothness is high, optical detection for the immobilized biomolecules is not disturbed. Further, since biomolecules are immobilized onto only an arbitrary area on the plate surface, immobilization position and shape of biomolecules can be accurately limited. Furthermore, since the carboxyl groups which are not reacted with the biomolecules are protected by protective groups, the carboxyl groups in their free states never bind to excess biomolecules, whereby the biomolecules can be stably immobilized with the carboxyl groups.

Further, in the biomolecule-immobilized plate according to the present invention, the polymer material is one selected from a group consisting of polymethyl methacrylate, polyethylene terephthalate, and polycarbonate.

Further, in the biomolecule-immobilized plate according to the present invention, the protective groups are amino groups.

Further, in the biomolecule-immobilized plate according to the present invention, the biomolecules are one selected from a group consisting of nucleic acid, protein, and peptide.

A method for fabricating a biomolecule-immobilized plate according to the present invention comprises preparing a plate having a flat part, at least a surface of the flat part comprising a polymer material; and irradiating the flat part with an ultraviolet ray under ozone atmosphere to produce, on a portion of the flat part, functional groups having bonding ability to the biomolecules.

According to the biomolecule-immobilized plate fabrication method of the present invention, since functional groups having bonding ability to biomolecules can be produced on the plate surface without damaging the smoothness of the plate surface, it is possible to fabricate a biomolecule-immobilized plate which does not inhibit optical detection for biomolecules which are immobilized via functional groups.

Further, a method for fabricating a biomolecule-immobilized plate according to the present invention comprises preparing a plate having a flat part, at least a surface of the flat part comprising a polymer material; irradiating the flat part with an ultraviolet ray under ozone atmosphere to produce carboxyl groups on a portion of the flat part; immobilizing biomolecules onto the flat part via the carboxyl groups; and adding protective groups for protecting carboxyl groups which have no biomolecules bonded thereto.

According to the biomolecule-immobilized plate fabrication method of the present invention, since carboxyl groups having bonding ability to biomolecules can be produced on the plate surface without damaging the smoothness of the plate surface, it is possible to fabricate a biomolecule-immobilized plate which does not inhibit optical detection for biomolecules which are immobilized via carboxyl groups. Further, since the carboxyl groups which are not reacted with the biomolecules are protected by protective groups, the carboxyl groups in their free states never bind to excess biomolecules, whereby the biomolecules can be stably immobilized with the carboxyl groups.

Further, in the method for fabricating a biomolecule-immobilized plate according to the present invention, a mask which exposes an arbitrary area of the flat part is disposed, and the arbitrary area is irradiated with an ultraviolet ray under ozone atmosphere.

According to the biomolecule-immobilized plate fabrication method of the present invention, since a functional group formation area on the plate surface can be specified, immobilization position and shape of biomolecules can be accurately limited.

Further, in the method for fabricating a biomolecule-immobilized plate according to the present invention, the irradiation energy of the ultraviolet ray is larger than the bonding energy of carbon-carbon bonds of the polymer material constituting the flat part.

Further, in the method for fabricating a biomolecule-immobilized plate according to the present invention, the polymer material is one selected from a group consisting of polymethyl methacrylate, polyethylene terephthalate, and polycarbonate.

Further, in the method for fabricating a biomolecule-immobilized plate according to the present invention, the protective groups are amino groups.

Further, in the method for fabricating a biomolecule-immobilized plate according to the present invention, the biomolecules are one selected from a group consisting of nucleic acid, protein, and peptide.

BEST MODE TO EXECUTE THE INVENTION

Hereinafter, embodiments of the present invention will be described with reference to the drawings.

Embodiment 1

Figure 1:
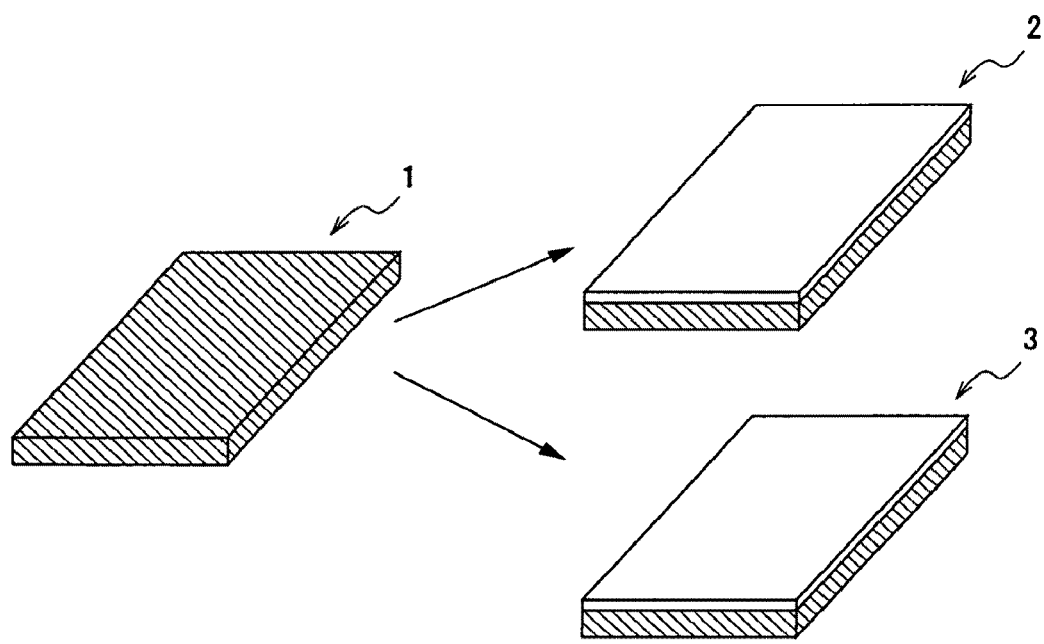
FIG. 1 is a schematic diagram illustrating a method for fabricating a biomolecule-immobilized plate according to a first embodiment of the present invention.

A biomolecule-immobilized plate according to a first embodiment of the present invention preferably comprises only a substrate 1 as shown in FIG. 1, and the substrate 1 itself is composed of a polymer material. However, a biomolecule-immobilized plate may be obtained by attaching a flat plate 2 comprising a polymer material onto the surface of a substrate 1 or by applying a polymer material 3 onto the surface of the substrate 1.

Further, the structure of the plate may be other than that shown in FIG. 1 so long as it has at least one flat surface onto which biomolecules can be immobilized. That is, the plate may be of a flat structure like a slide glass, or a concave or convex structure having at least one flat surface. The above-mentioned flat surface may be originally flat, or it may be flattened by machining, chemical polishing, or coating.

Furthermore, the surface of the plate is desired to have a high degree of flatness for performing optical detection, and preferably, it has an arithmetic average roughness of 0.1 nm~5 nm which is less affected by optical scattering. Hereinafter, the reason will be described.

When quantitatively detecting the amount of nucleic acid immobilized on a plate, it is necessary to immobilize nucleic acid uniformly on the surface of the plate. The rise distance of nucleic acid per base pair is 0.23 nm, and the diameter of double helix is 2.5 nm. When detecting nucleic acid, about 20 bases of probe nucleic acid are required. The reason is as follows. Since four base seeds exist in twenty bases, 4 to the 20th power of combinations are possible. Further, since human genome is composed of about thirty hundred million bases, exactly the same sequence never appears in the 20 bases of probe nucleic acid. The length of the 20 bases of nucleic acid is about 4.6 nm, considering the rise distance per base pair of nucleic acid. When the arithmetic average roughness becomes larger than the nucleic acid length on the plate surface, the nucleic acid is immobilized to the walls of the projections and depletions on the plate surface, which impedes uniform amount of immobilized nucleic acid and uniform irradiation of excitation light. Therefore, it is desired that the arithmetic average roughness is 5 nm or less. More preferably, it is desired that the arithmetic average roughness is equivalent to the roughness of glass (2 nm or less) which is hardly affected by optical scattering. If glass is employed, an arithmetic average roughness of about 0.1 nm can be realized.

If the arithmetic average roughness at the plate surface is large, scattering of excitation light applied to the biomolecules on the plate occurs when the biomolecules are subjected to fluorescence detection. Especially when detecting a very small quantity of biomolecules, scattering of excitation light causes noise components which deteriorate the S/N in the detection. So, the flatness of the plate must be maintained.

Figure 2:
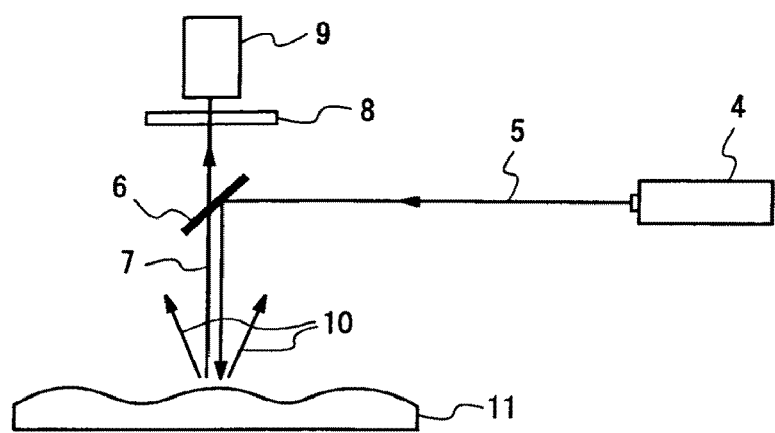
FIG. 2(a) is a schematic diagram illustrating scattering of excitation light when fluorescence measurement is carried out by irradiating a plate having a large arithmetic average roughness with excitation light.
FIG. 2(b) is a schematic diagram illustrating the state of excitation light when fluorescence measurement is carried out by irradiating a plate having a small arithmetic average roughness with excitation light.
Figure 2:
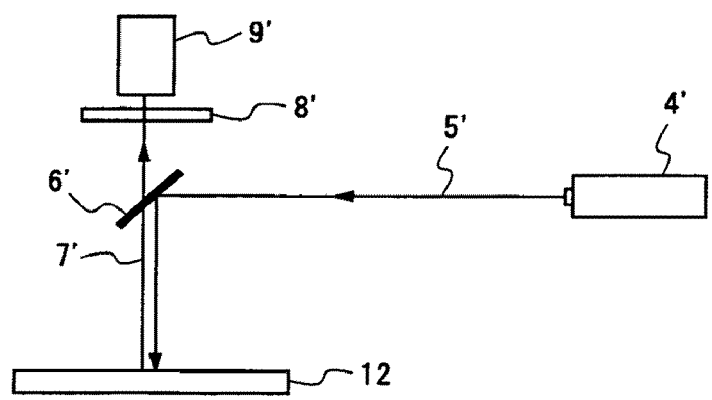

FIGS. 2(a) and 2(b) are schematic views for explaining scattering of excitation light which is caused by the large roughness of the plate surface during fluorescence detection. As shown in FIG. 2(a), an excitation light source 4 generates an excitation light 5, and the excitation light 5 reflected by a mirror 6 irradiates a specimen on a plate 11. A fluorescence light 7 from the specimen which is generated by the excitation light 5 is transmitted through a light reception filter 8 and detected by a photodetector 9. At this time, the excitation light 5 is scattered by the plate 11 having the large arithmetic average roughness, resulting in a scattered light 10. The scattered light 10 becomes noise light during measurement. On the other hand, in the case of FIG. 2(b), an excitation light 5' is not scattered because a plate 12 has a relatively small arithmetic average roughness, thereby reducing influence of noise light.

Although the plate may have an arbitrary size, it is preferably as large as a slide glass (25 mm×75 mm×1 mm) which is applicable to an existing detector. Further, the horizontal and vertical lengths of the plate may be 1 inch (25.4 mm) and 3 inches (76.2 mm), respectively.

Further, polymethyl methacrylate, polyethylene terephthalate, or polycarbonate is preferable as a polymer material. Further, any of polyacrylonitrile, polyimide, polystyrene, polyethylene, polypropylene, teflon (registered trade name), and polyfluoroethylene, or a mixture thereof may be employed. Particularly, polymethyl methacrylate has a very high optical transparency and therefore is suitable for detection of biomolecules utilizing the optical detection method. Furthermore, any of these polymer materials may be produced on a substrate comprising glass, silicon, or the like.

Hereinafter, a method of fabricating a biomolecule-immobilized plate according to the first embodiment will be described in detail.

Figure 3:
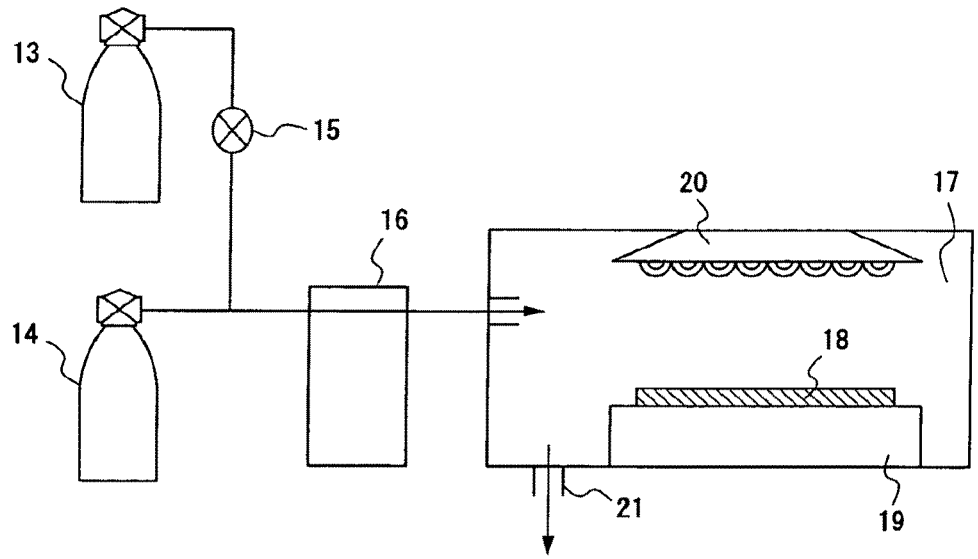
FIG. 3 is a schematic diagram illustrating a device which realizes a method for fabricating a biomolecule-immobilized plate according to the first embodiment of the present invention.

FIG. 3 is a schematic diagram of a device that realizes the biomolecule-immobilized plate fabrication method according to the first embodiment. The device shown in FIG. 3 is provided with an oxygen cylinder 13, a nitrogen cylinder 14, a flowmeter 15, an ozone generator 16, a chamber 17, a heater-equipped specimen support, and an ultraviolet lamp 20, and the device irradiates a plate 18 with ultraviolet light. The plate 18 is, as described above, any of a plate in which a substrate itself comprises a polymer material, a plate obtained by bonding a flat plate comprising a polymer material to the surface of a substrate, and a plate obtained by coating the surface of a substrate with a polymer material.

A description will be given of process steps for fabricating a biomolecule-immobilized plate using the device constituted as described above. Initially, the plate 18 is put on the heater-equipped specimen support 19 in the chamber 17. Next, oxygen gas is supplied from the oxygen cylinder 13 into the ozone generator 16 while controlling the flow rate with the flowmeter 15. Next, ozone is generated from oxygen by silent discharge in the ozone generator 16, and the generated ozone is introduced into the chamber 17. Thereafter, the plate surface is irradiated with ultraviolet light by the ultraviolet lamp 20, whereby carboxyl groups and/or carbonyl groups are produced on the plate surface. After a predetermined time has passed, ozone introduction and ultraviolet irradiation are stopped, and nitrogen gas is supplied from the nitrogen cylinder 14 into the chamber 17. The introduced nitrogen gas and the gas remaining in the chamber 17 are exhausted from the chamber 17 through an exhaust hole 21.

As a light source of ultraviolet light to be applied to the plate 18 for surface treatment, a low-pressure mercury vapor lamp, an excimer lamp, an excimer laser, or the like may be employed. Further, dielectric barrier discharge, holocathode discharge, microwave discharge, or the like is applicable as an excimer lamp discharging method, and a conventionally used gas such as argon, krypton, krypton chloride, xenon or the like is available as a discharge gas. Further, as an excimer laser, a laser which has been used for the conventional method, such as krypton fluoride laser or argon fluoride laser, is available.

Further, the irradiation energy of the ultraviolet light applied to the plate 18 should be 348 KJ/mol or higher in order to cut carbon-carbon bonds (bond energy: 348 KJ/mol) and carbon-hydrogen bonds (bond energy: 413 KJ/mol) on the polymer material surface which forms the surface of the plate 18. The irradiation energy is desirably lower than 5000 KJ/mol because the specimen might be deteriorated or the plate might be deformed if the irradiation energy is too high. More preferably, it is desired to be 1000 KJ/mol or lower.

Further, as a gas to be used for surface treatment of the plate 18, nitrogen, argon, xenon, krypton, carbon monoxide, carbon dioxide, air, or a mixture thereof may be employed besides oxygen and ozone.

Figure 4:
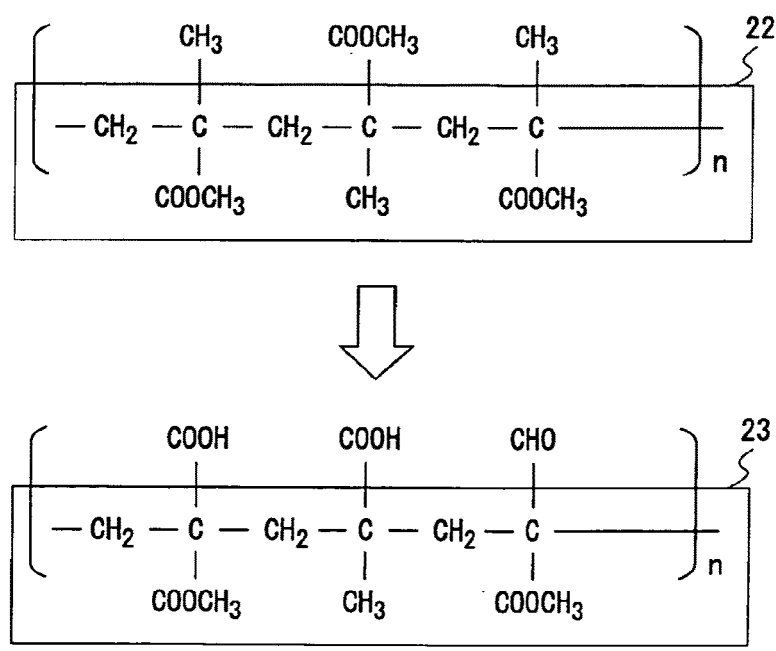
FIG. 4 is a schematic diagram illustrating a reaction pattern of a plate surface during plate surface treatment in the biomolecule-immobilized plate fabrication method according to the first embodiment of the present invention.

Next, a description will be given of change in the plate surface during the process of fabricating the biomolecule-immobilized plate, with reference to FIG. 4. FIG. 4 is a schematic diagram illustrating change in the plate surface when the polymer material forming the plate surface is polymethyl methacrylate. When the plate 22 is irradiated with ultraviolet light in ozone atmosphere, carbon-carbon bonds or carbon-hydrogen bonds of the polymer material forming the surface of the plate 22 are dissociated. When the dissociated carbon atoms bind to the oxygen atoms in the chamber 17, carbonyl groups and carboxyl groups are produced as functional groups on the plate surface, resulting in a plate 23. In FIG. 4, n is an arbitrary natural number not less than 1.

Next, a description will be given of evaluation of formation of functional groups on the plate surface after the plate is subjected to surface treatment by ultraviolet irradiation. In the present invention, since hydrophilic groups are produced as functional groups on the plate surface, evaluation is carried out by measuring the contact angle to the water (hydrophilic groups) on the plate surface. Since change in the contact angle contributes not only to chemical change but also to physical change, the arithmetic average roughness is measured after the surface treatment by ultraviolet light. As the result, the arithmetic average roughness remains unchanged before and after the surface treatment. It becomes evident from the result that change in the contact angle after the surface treatment by the ultraviolet irradiation is caused by only the chemical surface change, that is, the change of the hydrophobic groups at the plate surface to the hydrophilic groups. Therefore, it can be said that the contact angle can be changed without roughening the plate surface by treating the plate surface with ultraviolet irradiation, and the formation of the functional groups can be evaluated by measuring the contact angle.

The treatment of the plate surface using ultraviolet irradiation is desired to be carried out so that the contact angle after the surface treatment becomes 0.5 to 0.01 time as large as the contact angle before the surface treatment. When the contact angle increases by 0.5 time, 50% of hydrophobic groups are changed to hydrophilic groups. When actually immobilizing biomolecules, it is desired that 50% or more of hydrophobic groups are changed to hydrophilic groups. However, when immobilizing biomolecules in high density on the plate, it is desired that the surface treatment is carried out so that the contact angle increases by 0.3 time or less.

Figure 5:
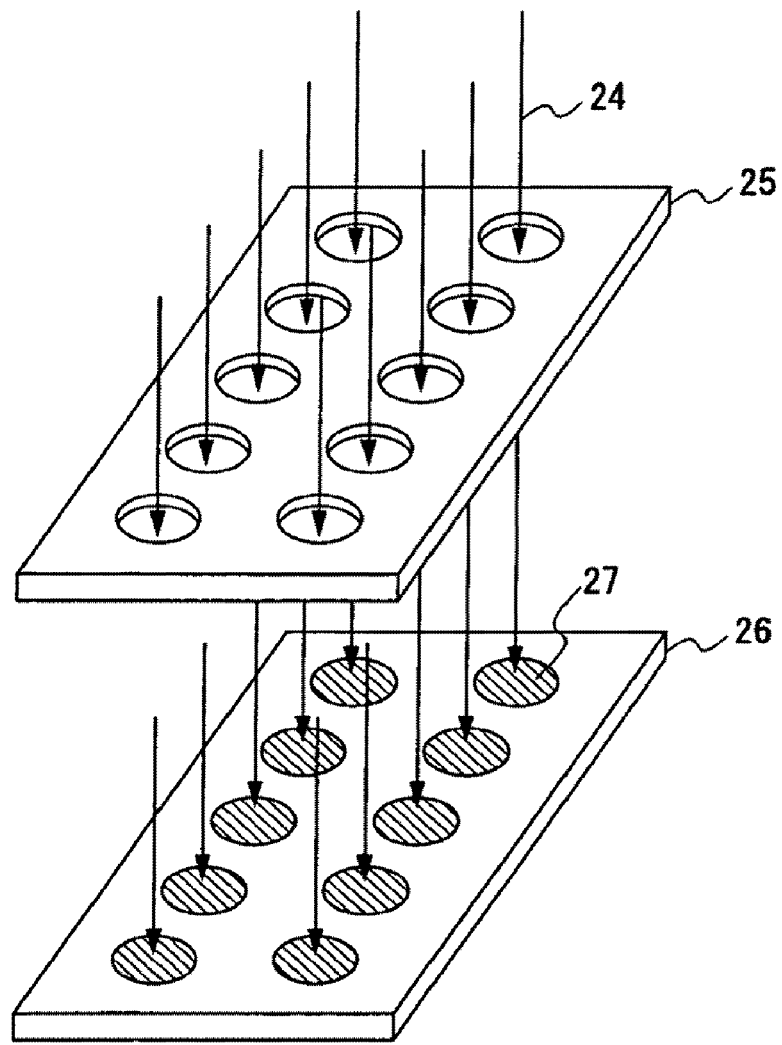
FIG. 5 is a diagram for explaining the steps of processing the plate surface using masking, in the biomolecule-immobilized plate fabrication method according to the first embodiment of the present invention.

The functional groups are produced by irradiating the plate with ultraviolet light as described above. When the plate is irradiated with the ultraviolet light, an ultraviolet light shielding mask 25 having an arbitrary shape may be placed between the ultraviolet lamp and the plate as shown in FIG. 5. Thereby, the ultraviolet light 24 can be applied to an area 27 having an arbitrary shape on the plate surface, and therefore, the area in which biomolecules are to be immobilized can be accurately defined. Accordingly, definition of the spot position and uniformization of the spot shape, which become objectives when introducing functional groups onto the plate surface, are facilitated, thereby improving the detection accuracy.

Figure 6:
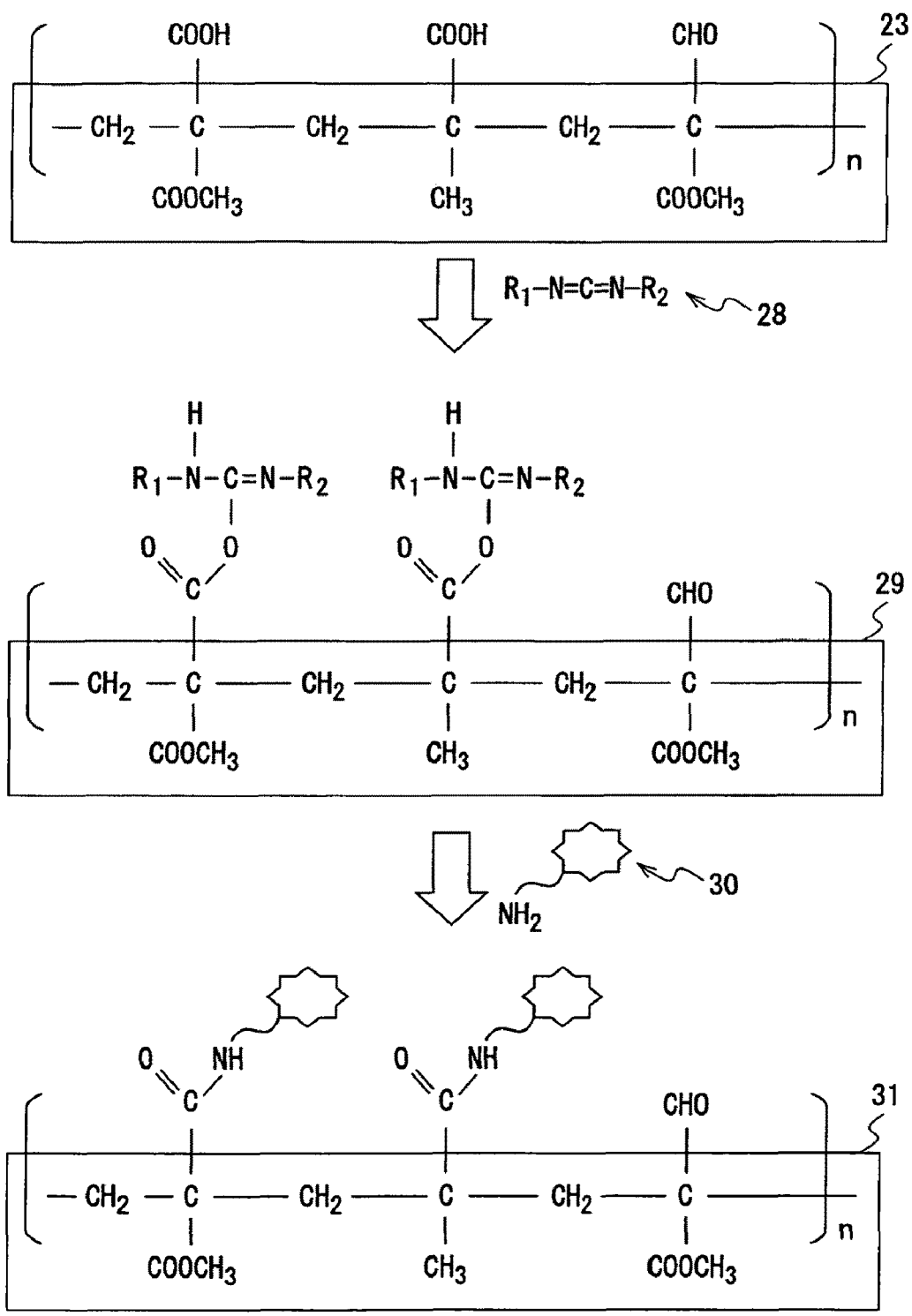
FIG. 6 is a schematic diagram illustrating a reaction pattern of a plate surface during immobilization of biomolecules onto a plate that has been subjected to surface treatment, in the biomolecule-immobilized plate fabrication method according to the first embodiment of the present invention.

Next, a description will be given of a method for immobilizing biomolecules on a plate onto which functional groups are introduced by performing the above-mentioned surface treatment, with reference to FIG. 6. FIG. 6 is a schematic diagram illustrating a reaction in the process of immobilizing biomolecules on the plate. On the plate 23 which has been subjected to surface treatment as shown in FIG. 4, biomolecules having amino groups are reacted with carboxyl groups (in the figure, —COOH) on the plate surface using, as a catalytic agent, carbodiimide compound 28 (in the figure, $R_1$—N=C=N—$R_2$, $R_1$ and $R_2$ are appropriate hydrocarbon radicals such as di-p-toluoyl and cyclohexyl, respectively) all day and night at room temperature so that the solution is not dried. Then, a plate 29 to which the carbodiimide compound 28 is bonded is produced, and the amino groups included in the biomolecules 30 bind covalently to the carboxyl groups at the plate surface due to amide bonding, thereby providing a plate 31 on which the biomolecules 30 are immobilized. In order to prevent the carboxyl groups at the plate surface from being in the free state, it is desired to pretreat the plate with hydrochloric acid of about 0.1 N before this reaction, or make the reaction condition acidulous. Thereby, the biomolecules immobilized on the plate by the above-mentioned reaction can be stabilized without being freed from the plate.

Immobilization of biomolecules to carbonyl groups (in the figure, —CHO) can be realized by a method of producing Schiff base (—CH=NH—) with amino acid of biomolecules, or a process of introducing hydrazine groups ($H_2$NNH—) into biomolecules.

The biomolecules are preferably any of nucleic acid, protein, and peptide. Further, antibody, enzyme, receptor, sugar, fat, vitamin, hormone, materials related thereto, and synthetic oligosaccharide thereof are also applicable.

Further, when there is no amino group in biomolecules, amino groups may be introduced into the biomolecules by previously performing an appropriate modification.

After the immobilization of biomolecules onto the plate, a material having amino groups or hydroxyl groups, such as aminoethanol, is reacted to the carboxyl groups which are not reacted with the amino groups in the biomolecules, whereby the amino groups (protective groups) in this material are added to the non-reacted carboxyl group to shield the carboxyl groups in the free states. Since the hydrophilic functional groups such as carboxyl groups have affinities to water contained in biomolecules or to solutions such as buffer, bonding of biomolecules can be smoothly carried out. However, when carboxyl groups are used as hydrophilic functional groups to be immobilized onto the plate, carboxyl groups which are not reacted with desired biomolecules are undesirably absorbed or bonded to unexpected biomolecules, resulting in noise components in measurement. Therefore, protective groups (amino groups) are added to the non-reacted carboxyl groups to suppress nonspecific bonding of unexpected materials. Through the above-mentioned processing, the carboxyl groups in their free states are prevented from being bonded to the amino groups included in the excessive biomolecules, resulting stable immobilization of the biomolecules.

As described above, in the method of fabricating a biomolecule-immobilized plate according to the first embodiment, polymer materials forming a plate surface is irradiated with an ultraviolet ray under ozone atmosphere to break carbon-carbon bonds and carbon-hydrogen bonds in the polymer materials, thereby producing carboxyl groups as functional groups on the plate surface, and then the functional groups and the biomolecules are covalently bonded, thereby producing a biomolecule-immobilized plate. Therefore, the functional groups for immobilizing the biomolecules onto the plate surface can be produced easily and inexpensively without varying the smoothness and the optical characteristics of the plate surface. As a result, it is possible to accurately detect the biomolecules immobilized onto the plate, using various kinds of detection methods such as an optical detection method like absorption, fluorescence, or emission, an electrochemical method, a surface plasmon resonance method, a crystal oscillator method, and a terahertz time dispersion method.

Furthermore, in the method of fabricating a biomolecule-immobilized plate according to the first embodiment, protective groups (amino groups) are added to the carboxyl groups which are not reacted with the amino groups in the biomolecules. Thereby, the carboxyl groups in their free states are prevented from being absorbed or bonded to the excessive biomolecules, and therefore, the biomolecules can be immobilized onto the plate with stability.

While in this first embodiment a method of fabricating a biomolecule-immobilized plate using a plate having a flat surface has been described, the present invention is not restricted thereto and is applicable to, for example, a microplate.

EXAMPLES

Example 1

In this first example, a description will be given of a process of producing functional groups on a plate surface in a method of fabricating a biomolecule-immobilized plate according to the present invention. Using a polymethyl methacrylate (PMMA) plate (manufactured by Nitto Plastic Industry Co. Ltd., Trade Name: CLAREX, thickness: 0.2 mm), this plate is set on a specimen support in a chamber of an ultraviolet ray irradiation device (manufactured by SAMCO) as shown in FIG. 3. The temperature of the plate is increased to 50° C. using a heater attached to the specimen support, and an ultraviolet ray (hereinafter, referred to as $O_3$/UV) is applied to the plate for ten minutes, using a low-pressure mercury lamp (wavelengths: 254 nm and 185 nm) as a light source, at an output power of 110 W, under ozone atmosphere. The flow rate of oxygen as an ozone source is 1 l/min.

The state of the plate surface after the UV irradiation under the ozone atmosphere is evaluated with variations in the contact angle, and observed using an atomic force microscope, and further, measured by X ray photoelectron spectroscopy. The results will be described hereinafter.

Table 1 represents the measurement results of variations in the contact angle (variations in wettability) relative to hydrophilic groups on a PMMA plate irradiated with $O_3$/UV. Further, table 1 also represents the measurement result of the arithmetic average roughness in 500 nm square after observing the surface of the PMMA plate irradiated with $O_3$/UV using an atomic force microscope (DI3000 manufactured by Digital Instruments Co., Ltd.). The contact angle decreases from about 70 degrees to about 20 degrees with the lapse of the $O_3$/UV irradiation time. Since change of the plate surface to hydrophilicity, i.e., change of the contact angle, was hardly seen even after a week, it can be said that the effect of the plate surface processing by the $O_3$/UV irradiation is sustained. Since the change in the contact angle occurs due to change of the plate surface from hydrophobicity to hydrophilicity or due to formation of unevenness at the plate surface, the actual surface of the plate is observed. As the result, with reference to table 1, it is suggested that the change of the contact angle is caused by only the hydrophilic functional groups produced on the plate surface, because there is no change in the smoothness of the PMMA plate surface due to the $O_3$/UV irradiation.

TABLE 1

| surface processing time (min.) | contact angle (degree) | arithmetic average roughness (nm) |
| --- | --- | --- |
| 0 | 73 | 0.4 |
| 0.5 | 64 | 0.4 |
| 1 | 54 | 0.4 |
| 5 | 26 | 0.4 |
| 10 | 17 | 0.4 |

Figure 7:
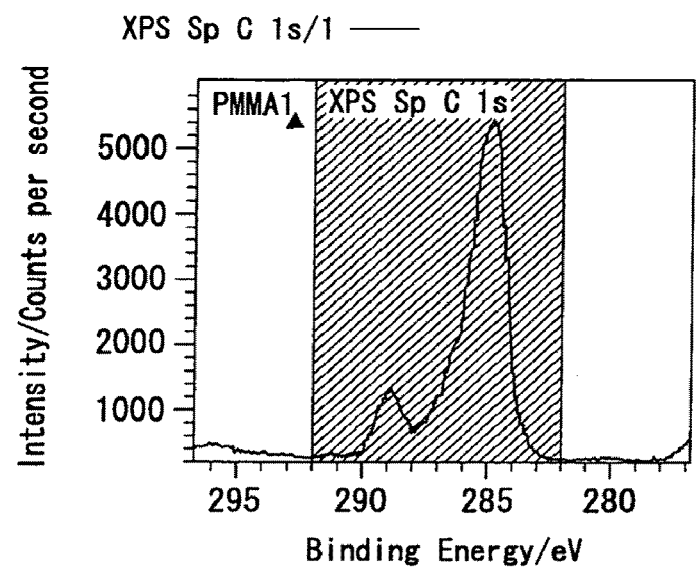
FIG. 7(a) is an X ray photoelectron dispersion spectrum diagram which is obtained when changes of functional groups on a plate surface that has not been subjected to ultraviolet-ray treatment are measured by an X ray photoelectron spectroscopy, in the first embodiment of the present invention.
FIG. 7(b) is an X ray photoelectron dispersion spectrum diagram which is obtained when changes of functional groups on a plate surface that has been subjected to ultraviolet-ray irradiation under ozone atmosphere are measured by an X ray photoelectron spectroscopy, in the first embodiment of the present invention.
Figure 7:
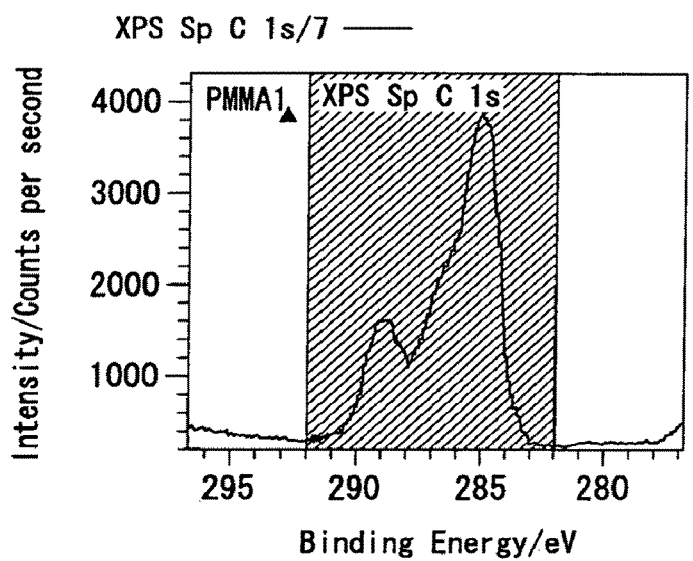

Next, a description will be given of the result of analysis for variations in the chemical compositions at the PMMA plate surface due to the $O_3$/UV irradiation, using an X ray photoelectron spectroscopic analysis device (AXIS-HSU manufactured by Shimadzu Corporation). A circular area having an analysis area diameter of 1.1 mm is measured using an X-ray anode MGKα ray of 1253.6 eV, at an accelerating voltage of 1.5 kV-300 W. Energy correction is performed using C1s spectrum of 284.8 eV. FIG. 7(a) shows a C1s spectrum at an untreated PMMA plate surface, and FIG. 7(b) shows a C1s spectrum at a PMMA plate surface irradiated with $O_3$/UV for ten minutes. As shown in FIG. 7(a), on the untreated plate, peak energies exist at about 285 eV and at about 289 eV, and the peak of about 285 eV is caused by carbon-carbon bonds and carbon-hydrogen bonds while the peak of about 289 eV is caused by carboxyl bonds. Since the PMMA has side-chain carboxymethyl in its structure, the peak of 289 eV appears. On the other hand, on the PMMA plate surface irradiated with $O_3$/UV, as shown in FIG. 7(b), the peak of about 285 eV decreases while the peak of about 289 eV increases. This suggests that the carbon-carbon bonds and the carbon-hydrogen bonds are dissociated, whereby carboxyl groups are produced at the plate surface. Further, the peak shoulder in the vicinity of about 287 eV also increases. This suggests that carbonyl groups are also produced on the plate surface.

As described above, the plate surface irradiated with O$_3$/UV is evaluated with changes in the contact angle, observed by an atomic force microscope, and measured by an XPS. It is obvious from the measurement result that functional groups such as carboxyl groups and carbonyl groups are produced on the plate surface in the state where the smoothness of the plate surface is maintained.

Example 2

In this example 2, a description will be given of immobilization of biomolecules onto the PMMA plate which is irradiated with O$_3$/UV in the example 1.

In the example 2, oligonucleotide is employed as biomolecules. Further, duplex oligonucleotide described hereinafter is employed as a test sample. That is, 40-base oligonucleotide having a sequence of CCCCCTGGATCCAGATATG-CAATAA TTTTCCCACTATCAT which is positioned at the 629-668th from the 5' end of a genome sequence of human origin Cytochrome P-450 CYP2C19 (Kyoto University Institute for Chemical Research Genome Net WWW server, http://www.genome.ad.jp, searched on April, 2003), which modifies aminohexyl groups through phosphate groups at the 5' end (hereinafter referred to as "main chain", and synthesis thereof is entrusted to TAKARA BIO INC.) is mixed with oligonucleotide having a sequence of ATGATAGTGG-GAAAATTATTGCATATCTGGATCCAGGGGG from the 5' end, which is modified by biotinhexyl groups through phosphate groups at the 5' end and is complementary with the main chain (hereinafter referred to as "complementary chain", and synthesis thereof is entrusted to TAKARA BIO INC.), thereby producing 40 base pairs of duplex oligonucleotide as a test specimen. In the oligonucleotide sequence, A, G, T, and C represent adenine base, guanine base, thymine base, and cytosine base, respectively.

When immobilizing biomolecules, initially, a 60×24×8.5 mm silicon rubber having 12 through-holes each having a diameter of 6 mm (manufactured by VIVASCIENCE Co., Ltd.) is adhered onto a 100×25×0.2 mm PMMA plate which has been subjected to O$_3$/UV irradiation according to the first embodiment, whereby an immobilization area is defined in the test specimen. Next, the above-mentioned duplex 40 base pairs of oligonucleotide is dissolved into a reaction mixture (pH 5.5) comprising 10 mM of 1-ethyl-3-(3-dimethyl aminopropyl) carbodiimide and 50 mM of 2-morpholino ethane sulfonate-sodium hydroxide, and 50 µl of this reaction mixture is dropped into the immobilization area that is defined by the silicon rubber, and reaction is promoted all day and night at room temperature, whereby the amino groups existing at the 5' end of the main chain and the carboxyl groups existing at the plate surface are covalently bonded. After the reaction through all day and night, the reaction mixture is removed, and 50 µl of reaction mixture (pH 5.5) comprising 200 mM of 2-aminoethanol, 10 mM of 1-ethyl-3-(3-dimethyl aminopropyl) carbodiimide, and 50 mM of 2-morpholino ethane sulfonate is dropped, and then reaction is promoted for two hours at room temperature, whereby the carboxyl groups in their free states are shielded. Next, the silicon rubber that defines the immobilization area is removed from the plate, and the plate is soaked into a solution (pH 7.5) comprising 0.5% of bovine serum albumin, 0.6M of sodium chloride, 0.1M of tris (hydroxymethyl) aminomethane-hydrochloric acid at room temperature for thirty minutes. Next, the plate is soaked into a solution comprising 25 µg/ml of HRP (horseradish peroxidase)-labeled antibiotin antibody (created by Sigma Chemical Co., Ltd.), 0.5% of bovine serum albumin, 0.6M of sodium chloride, and 0.1M of tris (hydroxymethyl) aminomethane-hydrochloric acid at room temperature for thirty minutes, thereby promoting a reaction of biotin antibody with biotin which exists at the complementary strand side of the 40 base pairs of oligonucleotide immobilized on the plate. Next, the plate is soaked in a solution (pH 7.5) comprising 0.1% of Tween 20, 0.6M of sodium chloride, and 0.1M of tris (hydroxymethyl) aminomethane-hydrochloric acid, three times for ten minutes at room temperature, whereby unreacted antibody is removed. Finally, the plate is taken out of the solution, and dried lightly. Thereafter, a luminol-hydrogen peroxide solution (ECL Detection Reagents, produced by Amersham Biosciences K.K.) is dropped, and light emission caused by a reaction with antibody-labeled peroxidase is applied to a film for chemical emission (Hyperfilm ECL, produced by Amersham Biosciences K.K.), thereby detecting the 40 base pairs of duplex oligonucleotide which are immobilized onto the PMMA plate surface irradiated with O$_3$/UV.

Figure 8:
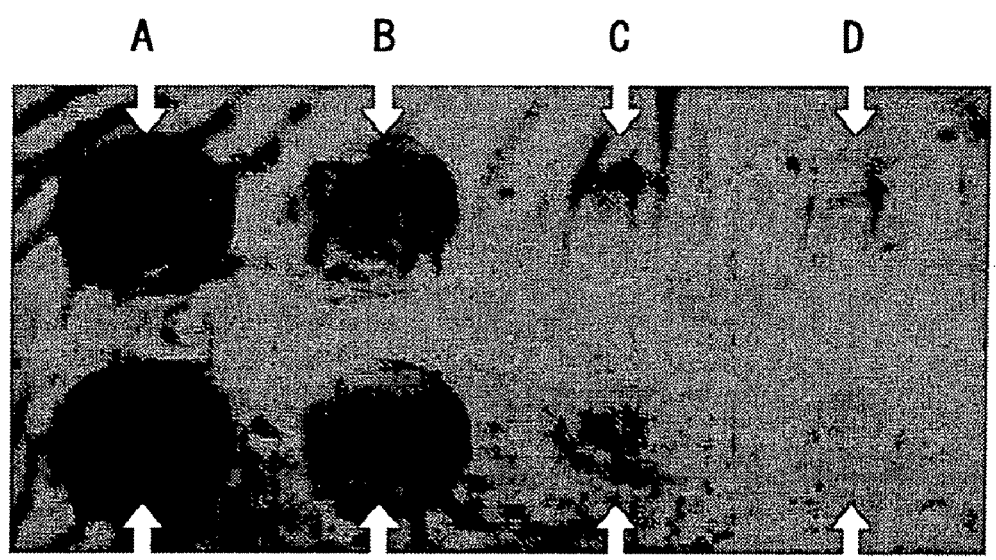
FIG. 8 is a film emulsion photograph obtained when duplex oligodeoxynucleotide immobilized on a plate is detected by a chemiluminescence method, according to a second embodiment of the present invention.
Figure 9:
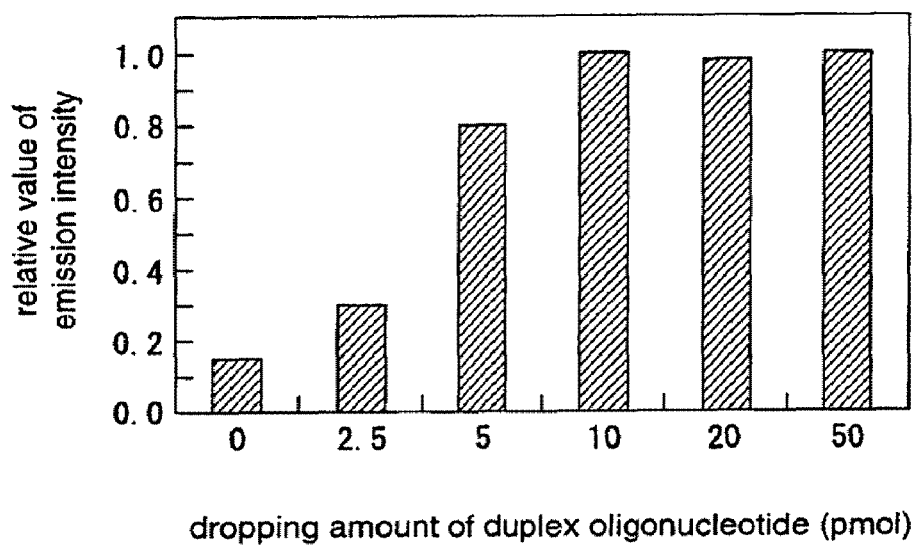
FIG. 9 is a diagram illustrating measured immobilization amount of duplex oligodeoxynucleotide onto a plate, according to the second embodiment of the present invention.

FIGS. 8 and 9 show the results of evaluation for the immobilization ability of the duplex oligonucleotide onto the PMMA plate having the surface on which hydrophilic groups are produced by O$_3$/UV irradiation.

FIG. 8 is a diagram illustrating the result of detection of oligonucleotide immobilized onto the plate, wherein duplex oligonucleotide having concentrations of (A) 200 nM, (B) 100 nM, (C) 50 nM, and (D) 0 nM are respectively dropped by 50 µl to perform immobilization thereof. The total amount of oligonucleotide dropped is 10, 5, 2.5, and 0 pmol, respectively. It is evident from FIG. 8 that the emission intensity increases and thereby the degree of photosensitivity of the film increases with an increase in the concentration of the oligonucleotide to be immobilized.

FIG. 9 is a graph in which the emission intensity relative to the amount of oligonucleotide dropped onto the plate is quantified. Quantification of the emission intensity is realized by converting the photosensitive film into digital data, and measuring the RGB values (Photoshop ver. 6, Adobe Co., Ltd.). The axis of abscissa shows the absolute amount of the oligonucleotide dropped to be immobilized, and the axis of ordinate shows the relative intensity to the emission intensity with the amount of the dropped oligonucleotide being 10 pmol. Since, as shown in FIG. 9, the emission intensity reaches the maximum value when the amount of dropped oligonucleotide is 10 pmol, the amount of immobilized oligonucleotide per unit area is 35 pmol/cm$^2$.

Further, table 2 shows the amount of immobilized oligonucleotide per unit area with the plate surface treatment time being varied. Table 2 indicates that the immobilization amount increases in proportion to the surface treatment time. That is, table 2 indicates that the functional groups on the surface increase with an increase in the treatment time. As described above, it is evident from tables 1 and 2 that the immobilization amount of oligonucleotide increases with an increase in the functional groups generated at the plate surface.

TABLE 2

| surface processing time (min) | immobilization density (pmol/cm2) |
|---|---|
| 0 | 0 |
| 0.5 | 4 |
| 1 | 9 |
| 5 | 29 |
| 10 | 35 |

The invention claimed is:

1. A method for fabricating a biomolecule-immobilized plate comprising: preparing a plate having a flat part, at least a surface of the flat part comprising a polymer material; irradiating the flat part with an ultraviolet ray under ozone atmosphere to produce carboxyl groups on a portion of the flat part; immobilizing biomolecules onto the flat part via the carboxyl groups; and adding protective groups for protecting carboxyl groups which have no biomolecules bonded thereto after immobilization of the biomolecules.

2. A method for fabricating a biomolecule-immobilized plate as defined in claim 1 wherein a mask which exposes an arbitrary area of the flat part is disposed, and the arbitrary area is irradiated with an ultraviolet ray under ozone atmosphere.

3. A method for fabricating a biomolecule-immobilized plate as defined in claim 1 wherein the irradiation energy of the ultraviolet ray is larger than the bonding energy of carbon-carbon bonds in the polymer material which constitutes the flat part.

4. A method for fabricating a biomolecule-immobilized plate as defined in claim 1 wherein said polymer material is one selected from a group consisting of polymethyl methacrylate, polyethylene terephthalate, and polycarbonate.

5. A method for fabricating a biomolecule-immobilized plate as defined in claim 1 wherein said protective groups are amino groups.

6. A method for fabricating a biomolecule-immobilized plate as defined in claim 1 wherein said biomolecules are one selected from a group consisting of nucleic acid, protein, and peptide.

* * * * *